United States Patent [19]

Parsons

[11] 4,174,033

[45] Nov. 13, 1979

[54] DOUBLE WALLED ROTARY TUBULAR CONVEYOR

[76] Inventor: Ronald Parsons, 15 Fieldhedge Dr., Hillsborough, N.J. 08876

[21] Appl. No.: 823,948

[22] Filed: Aug. 12, 1977

[51] Int. Cl.² .............................................. B65G 17/00
[52] U.S. Cl. .................................... 198/804; 198/643; 198/819; 417/320
[58] Field of Search .............. 198/819, 824, 804, 607, 198/626, 866, 643; 226/170; 417/320

[56] References Cited

U.S. PATENT DOCUMENTS

| 2,467,641 | 4/1949 | West | 417/320 X |
| 3,586,227 | 6/1971 | Krogsrud | 226/170 |
| 3,915,291 | 10/1975 | Vogts | 198/626 |

Primary Examiner—Robert B. Reeves
Assistant Examiner—Douglas D. Watts
Attorney, Agent, or Firm—David S. Woronoff

[57] ABSTRACT

A conveying device having a flexible member with inside and outside surfaces and first and second end positions forming inlet and outlet orifices. Support mechanisms disposed intermediate the inside and outside surfaces and a drive mechanism for engaging the flexible member and propelling it in a continuous closed loop such that the inside surface becomes the outside surface and the outside surface becomes the inside surface; that the relative shape and orientation of the first and second end portion is not altered; and, that the inside surface and the outside surface move in substantially opposite directions.

12 Claims, 4 Drawing Figures

DOUBLE WALLED ROTARY TUBULAR CONVEYOR

FIELD OF THE INVENTION

The present invention relates to conveyor devices for moving solid or semi-solid materials such a bulk chemicals, sand stone rock and various viscous fluids such as crude oil, molasses and the like. The present invention is also adapted to moving or conveying a wide variety of bulk materials which have mechanical properties similar to those noted above. Structurally the present invention is more like the conveyor belt than it is like any other known device.

BACKGROUND OF THE INVENTION

Many modern industrial processes require the movement of large masses of dry, semi-dry or viscous products from one place to another. For example, coal, sand, gravel, bulk chemicals, crude oil, molasses, plastic resins and many other similar materials must be transported from the place of origin to another place for finishing, weighing, grading, shipping, extruding and the like. Once shipped, such materials must often be moved again to a furnace, compressor, extruder, mixer or the like.

Currently there are four basic methods and structures for moving such materials. These are: Conveyor belts, bucket loaders or scoop systems, screw feeders and vacuum devices. Each of these devices has its limitations. Open conveyor belts are of limited capacity (relative to their size) because of the potential side spillage and also require constant support. If the conveyor belts are of the closed tube type loading and unloading of the tube is a problem solved only at considerable expense and with the use of relatively complex mechanical gears.

The bucket loader or scoop system resembles the well known coal loader type of device in which buckets are mounted on a movable chain or cable which is formed in a closed loop. The buckets are driven by the chain or cable in a closed loop through a loading station and an unloading station. In the least complicated of such system the unloading is accomplished by the bucket turning 180° around a pulley and starting on the return trip. The bucket empties into a large hopper which in turn must be emptied.

The vacuum system operates at very high temperatures and air flows of relatively high velocity and volume. In such a system the noise level tends to be very high and unacceptable by current standards of employee health and safety. In particular such systems must be modified to meet current Federal Regulations in many cases.

The bucket system and the vacuum system are relatively inefficient uses of energy for the mass of material moved. The conveyor belt systems are relatively efficient but require excessive amounts of space to move modest amounts of materials unless the tubular conveyors are used. Screw feeders are slow, heavy and very expensive.

Typical tubular or closed conveyor belt approaches are illustrated in the following U.S. Pat. Nos. N. G. Tribe; 3,358,812; C. O. Davidson; 3,332,537; E. J. Renner; 2,839,181; H. S. Johns; 2,212,024; H. S. Johns; 2,108,488.

Each of the above patents shows a closed tube of circular or rectangular cross-section having a longitudinal seam (i.e., along the direct of motion) which can be opened and closed for loading and unloading. While the structures shown in the above patents are workable, the structures are relatively complex. The conveyor belts or tubes must be relatively resilient and the weight of material transported is limited by the relative strength of the tube along the longitudinal slit; even if the longitudinal slit is above the materials being transported during some part of the cycle. Each of the above noted patents shows another approach to solving the problems inherent in the prior art closed tube structure.

SUMMARY OF THE INVENTION

The present invention relates to a novel conveying device having a main transporting member formed from a tube having an inside surface and an outside surface. Disposed in between the inside surface and the outside surface is a support and drive system for propelling and supporting the main transporting member. The main transporting member may be formed from a single tubular member which is rolled back on itself. The drive and supporting members inserted and the edges of the single tubular member sealed. The tube is preferably sealed along a non-circumferential line.

The drive and supporting member have two basic subassemblies. The first subassembly is located inside or in between the inside and outside surface of the tube and has beams and guides which extend from one end of the tube to the other. The beam and guide member give shape and support to the transporting member.

Also located within the inside and outside surfaces and normally (but not always) supported by the beam are one or more driven wheels which mate with the drive wheels through the flexible tubular member.

Commonly, but not invariably, the flexible tubular member will be formed with or of a "gear" belt or timing belt shape on either or both of the inner and outer surfaces. An external gear or drive member (which could be a belt or chain device) may be designed with gear teeth to engage the "gear" or "timing" belt surface of the transporting member. The driven wheel or wheels mate with the transporting member and the drive wheel or wheels. One embodiment of the invention has a single drive wheel per driving head mated with a pair of driven wheels (the driven wheel could be a single wheel biased toward the drive wheel) having the main transporting member disposed therebetween. Generally there should be at least two driven wheel sets per transporting member disposed about 180 degrees apart around the periphery of the transporting member. An alternate embodiment has four or more driving wheels per completed conveying device in which the drive wheel assemblies are disposed in 90 degree segments about the periphery of the tubular transporting member. Another alternate embodiment has drive wheels at or near each end of the transporting device. In such an embodiment the second set of drive wheels may replace or substitute for a portion of the support structures. The portion of the tube disposed in between the drive wheels and the driven wheels should be relatively rigid and inflexible, especially when compared to the main portion of the tube.

A plurality of tube sections may be joined to increase the overall length of the conveyor device. Joining the tube may be a head box connected in a conventional manner.

The tube member may have paddles or ears formed on the inside and outside surfaces which help to propel or carry the material to be conveyed through the tube.

DESCRIPTION OF THE INVENTION

Figure 2:
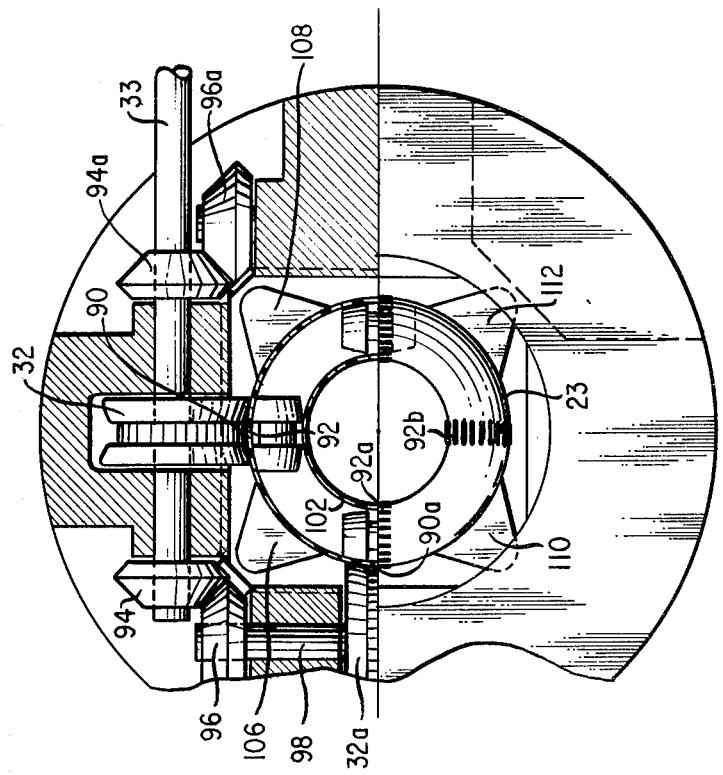
FIG. 2 shows a section of the embodiment shown in FIG. 1 taken along the line 2—2.
Figure 1:
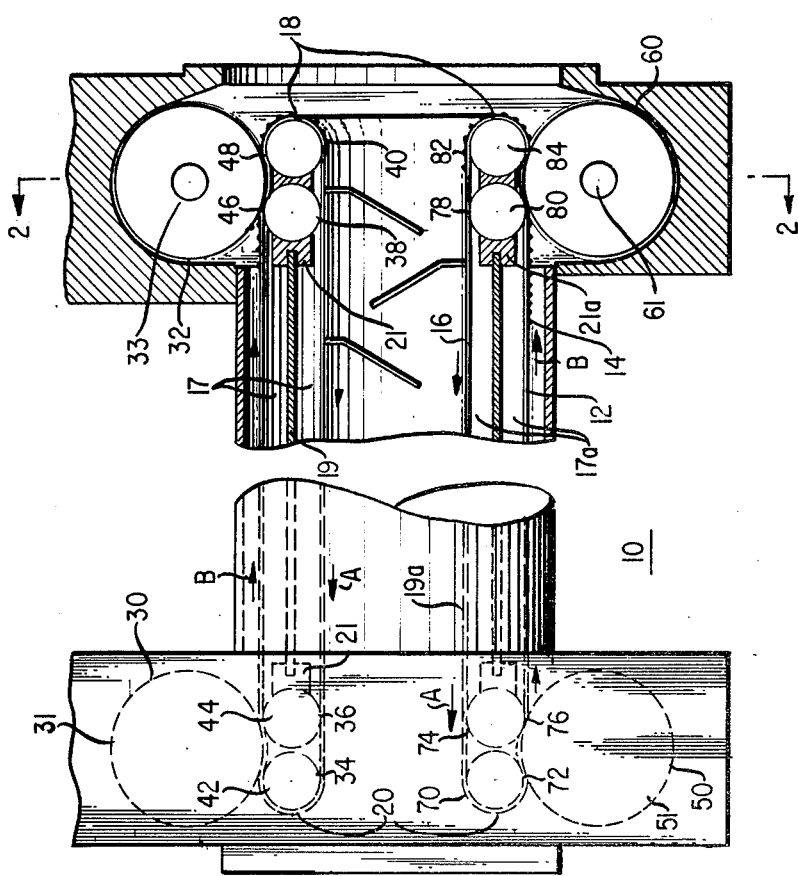
FIG. 1 shows a side view of one embodiment of the present invention partially broken away and in section.

FIGS. 1 and 2 show a conveying device 10 having a tubular member 12 with an inner and outer surface 14, 16 respectively. A space 17 is created between the inner 16 and outer 14 surfaces. Disposed in the space is a support beam 19 fixedly connected to axle support 21 from which axles 42, 44, 46, 48, suspend driven rollers or wheels 34, 36, 38, 40 respectively. A similar structure is shown by beam 19a and axle support member 21a supporting axles 72, 76, 80, 84 which in turn support driven wheels or rollers 70, 74, 78, 82.

An external drive shaft 33 supported by a bearing structure, not shown, has gears 94, 96, 94a, 96a etc for driving main drive wheels 32, 32a. Drive wheels 32, 32a have gear teeth 90, 90a which mate with teeth 92, 92a formed on the surface of the tube member 12. Ears or paddles 106, 108, 110, 112 are formed in the periphery 23 of the tube at sufficiently frequent intervals to insure the progress of the material to be moved at the desired rate.

Figure 4:
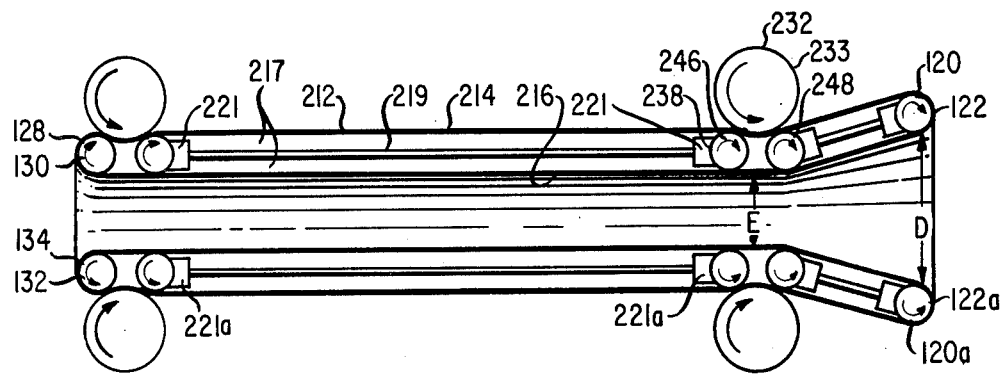
FIG. 4 shows a second embodiment of the present invention.

The second embodiment of the present invention is shown in FIG. 4. In FIG. 4, parts with similar functions to those parts in FIG. 1 have the same number preceded by the number "2", i.e., 212 and 12 are similar parts.

In space 217, beam 219 supports axle support 221, 221a which also support end rollers or wheels 120, 1202 on axles 122, 122a. In this embodiment only one set of drive wheels are used. The tube 212 is supported by end wheel 120, 120a. Distance "D" is larger than distance "E".

Figure 3:
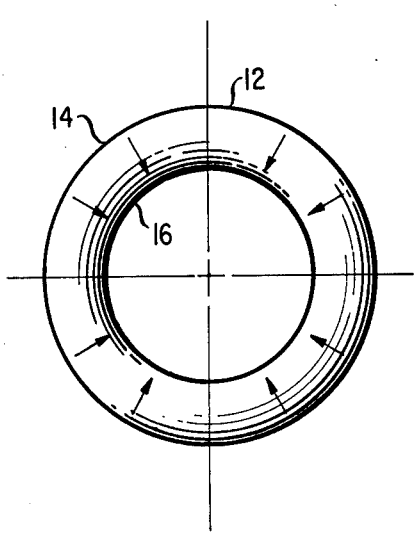
FIG. 3 shows an end view of a portion of the structure shown in FIG. 1.

In operation, supplying power to shaft 33 drives gears 32, 94, 94a, 96, 96a etc. in the conventional manner. Gear 32 has teeth 90 which engage gear teeth 92 formed in the tubular member 12, 112. The end rollers in FIGS. 1 and 2 and the tubular members 12, 112 define inlet 18 and outlet 20. Naturally the inlet and outlet functions can be reversed, i.e., the device is bilateral. Rotation of shaft 33 drive tubular member 12, causes outer surface 14 to move in the direction shown by arrow B and inner surface 16 in the direction shown by arrow A. The tube 12, turns itself "inside out" continuously. This action is shown clearly in FIG. 3. Thus tube 12, is a continuous closed loop open at both ends. The device can move material in a horizontal and a vertical plane or any plane in between without loss of power. Lubricant can be dispensed inside 17 to lubricate the drive and support wheels.

The drive wheel 32 outer surface extends below the outer surface of wheels 46 and 48 as shown in FIG. 1. The flexible tube member 12 is thereby trapped and restrained in position and driving engagement. Similarly the outer surfaces of drive wheel 32 and driven wheels 46, 48 and the like are tapered as shown in FIG. 2 to follow the general contour of the flexible member to aid in stabilizing the tube member 12 during operation of the device.

I claim:

1. In a conveying device the combination comprising: a first flexible member having an inside surface, an outside surface and first and second end portions; said first and second end portions each have a generally annular shape about an orifice to form respectively an inlet and an outlet; first drive and support means disposed intermediate said flexible tube inside and outside surface; said drive and support means disposed relative to said first and second end portions to maintain said inlet and said outlet at a substantially constant separation and orientation with respect to each other; said drive means operative to propel said flexible member in a continuous closed loop such that said inside surface becomes said outside surface and said outside surface becomes said inside surface; and, said flexible member inside surface being a closed substantially continuous surface open at said first and second end portions.

2. The device claimed in claim 1 wherein:
said drive member has a gear surface formed therein.

3. The device claimed in claim 2 wherein:
said flexible member has a gear surface formed therein for engaging said drive member gear surface.

4. The device claimed in claim 1 wherein:
said flexible member has a friction surface formed thereon for engaging said drive wheel.

5. The device claimed in claim 1 wherein:
the tubular member inner surface has a plurality of paddles formed thereon.

6. In a conveying device the combination comprising: a hollow flexible tube member formed in a generally annular cross section and having a double wall; a driven means disposed within said double wall of said flexible tube member; an internal support means disposed within said double wall of said flexible tube member for supporting said driven member and said flexible tube member; a drive means disposed adjacent said flexible tube member for providing external support to said internal support means and for propelling one of the walls of said flexible tube member such that both of said walls of said flexible tube are in motion; said drive means engaged a portion of said flexible tube member; said hollow flexible tube member having first and second end portions forming inlet and outlet portions of said conveying device; said flexible tube member formed from a generally elastic material; and, said flexible tube member formed into a unitary structure open only at said end portions.

7. The device claimed in claim 6 wherein:
the portion of the tube engaged by said drive means is substantially rigid.

8. The device claimed in claim 6 wherein:
said portion of the tube engaged by said drive means is formed into a generally gear shaped structure.

9. In a conveying device the combination comprising: a hollow flexible tube member formed in a generally annular cross section and having a double wall; a driven means disposed within said double wall of said flexible tube member; an internal support means disposed with said double wall of said flexible tube member for supporting said driven member and said flexible tube member; a drive means disposed adjacent said flexible tube member for providing external support to said internal support means and for propelling one of the walls of said flexible tube member such that both of said walls of said flexible tube are in motion; said drive means engaged a portion of said flexible tube member; said hollow flexible tube member having first and second and portions forming inlet and outlet portion of said conveying device; said flexible tube member formed from a generally elastic material; and, said drive means comprises a plurality of gear members disposed at multiples of about ninety degrees about said flexible tube member adjacent at least one of said inlet or said outlet portions.

10. The device claimed in claim 9 wherein:
said driven means comprise a plurality of wheel members disposed adjacent each of said drive means gear members and maintained in close contact therewith through said flexible tube member.

11. The device claimed in claim 10 wherein:
said portion of the flexible tube member engaged by the drive means has a gear structure formed thereon.

12. The device claimed in claim 11 wherein:
said drive means and said driven means each have an outer surface adapted to mutually cooperate to entrap said flexible tube member; and,
said drive means and said driven means outer surface are contoured to mate with each other and to follow the contour of said flexible tube member.

* * * * *